US011886827B1

(12) United States Patent
Margolin

(10) Patent No.: US 11,886,827 B1
(45) Date of Patent: Jan. 30, 2024

(54) GENERAL INTELLIGENCE FOR TABULAR DATA

(71) Applicant: Intuit Inc., Mountain View, CA (US)

(72) Inventor: Itay Margolin, Petach Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/228,170

(22) Filed: Jul. 31, 2023

(51) Int. Cl.
  *G06F 40/40* (2020.01)
  *G06N 3/0455* (2023.01)

(52) U.S. Cl.
  CPC .......... *G06F 40/40* (2020.01); *G06N 3/0455* (2023.01)

(58) Field of Classification Search
  CPC ...... G06F 40/40; G06F 40/30; G06F 16/2228; G06F 16/24578; G06F 16/285; G06F 16/958; G06F 18/2113; G06F 18/214; G06F 18/241; G06F 18/253; G06F 3/167; G06F 40/242; G06F 16/35; G06F 40/284; G06F 40/289; G06F 16/23; G06F 16/3328; G06F 16/93; G06F 17/18
  See application file for complete search history.

(56) References Cited

U.S. PATENT DOCUMENTS

| | | | | |
|---|---|---|---|---|
| 11,294,974 B1 * | 4/2022 | Shukla | ............... | G06F 16/90335 |
| 11,386,096 B2 * | 7/2022 | Malik | ................. | G06F 16/9024 |
| 11,562,145 B2 * | 1/2023 | Tu | ......................... | G06F 40/242 |
| 11,687,544 B2 * | 6/2023 | Kelly | ............... | G06F 16/24564 |
| | | | | 707/769 |
| 11,715,315 B2 * | 8/2023 | Castillo | ................... | G06F 16/93 |
| | | | | 382/161 |
| 2015/0206070 A1 * | 7/2015 | Kulkarni | ........... | G06F 16/24578 |
| | | | | 706/12 |
| 2021/0073532 A1 * | 3/2021 | Torres | ................... | G06F 18/214 |
| 2021/0174193 A1 * | 6/2021 | Pouran Ben Veyseh | ..................... | |
| | | | | G06F 18/253 |
| 2021/0209513 A1 * | 7/2021 | Torres | ................... | G06F 40/284 |
| 2022/0245354 A1 * | 8/2022 | Mackay | ................. | G10L 25/57 |
| 2023/0237128 A1 * | 7/2023 | Russell | ............... | G06F 18/2323 |
| | | | | 706/12 |

(Continued)

OTHER PUBLICATIONS

CLIP: Connecting Text and Images, OpenAI, downloaded from internet on May 4, 2023 at https://openai.com/research/clip, 17-pages, Jan. 5, 2021.

(Continued)

*Primary Examiner* — Abdelali Serrou
(74) *Attorney, Agent, or Firm* — Paradice & Li LLP

(57) ABSTRACT

Systems and methods for generating a contextually adaptable classifier model are disclosed. An example method is performed by one or more processors of a system and includes obtaining a dataset, feature values, and labels, transforming each datapoint into a natural language statement (NLS) associating the datapoint's feature values and label with feature identifiers and a label identifier, generating a feature matrix for each NLS, transforming the feature matrix into a global feature vector, generating a target vector for each NLS, transforming the target vector into a global target vector having a same shape, and generating, using the vectors, a similarity measurement operation, and a loss function, a classifier model trained to generate a compatibility score predictive of an accuracy at which the classifier model can classify given data based on at least one of a different feature characterizing the given data or a different label for classifying the given data.

20 Claims, 3 Drawing Sheets

(56) References Cited

U.S. PATENT DOCUMENTS

2023/0244871 A1* 8/2023 Mohan ................. G06F 40/289
                                                          704/9
2023/0316098 A1* 10/2023 Sabapathy ............. G06F 18/24
                                                          706/12

OTHER PUBLICATIONS

Li et al., "Deep Entity Matching with Pre-Trained Language Models." arXiv preprint arXiv:2004.00584.3, Sep. 2, 2020.

* cited by examiner

GENERAL INTELLIGENCE FOR TABULAR DATA

TECHNICAL FIELD

This disclosure relates generally to generating and/or deploying a classifier model, and specifically to generating and/or deploying a contextually adaptable classifier model.

DESCRIPTION OF RELATED ART

Machine learning (ML)-based classifiers are used to classify a wide variety of data in various forms, such as text or images. Training data used in training classifiers is often in the form of tabular data (e.g., tables or spreadsheets), where a training dataset may include a plurality of datapoints characterized by some number of input features and/or classified by some number of target labels. For instance, a dataset may include a table where several columns in the table each represent a different input feature for characterizing books, such as "title", "author", "genre", and "word count", and each row (or "datapoint") in the table may represent a different book and include feature values characterizing the book according to the input features, such as values of "The Art of Rock Collecting", "John Smith", "Non-fiction", and "65,000" for a non-fiction book written by John Smith, including 65,000 words, and titled "The Art of Rock Collecting". The table may also include a target label, such as "audience", where each datapoint also includes a label value classifying the corresponding book according to the target label, such as "Children", "Young Adult", "Adult", or "Specialized" (for categorical labels) or a continuous value (e.g., 33) representing an age at which the book is targeted, where the example book described above may be classified as "Specialized". The feature values and labels in the dataset may be used to train the classifier to associate certain book features with certain classifications.

In this manner, the ML-based classifier may be trained on the narrow task of classifying books by "audience" given their "title", "author", "genre", and "word count". However, the trained model will be unable to classify a book by "theme" given its "title", "author", "genre", and "word count", as the model was not explicitly trained to do so. Similarly, the classifier model will be ineffective at classifying books by "audience" without feature values for the book that correspond to the features on which the model was trained. For instance, even given a book's "title", "publisher", "category", and "number of pages", the trained classifier will perform poorly without being given the book's "author", "genre", and "word count".

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for generating a contextually adaptable classifier model. An example method is performed by one or more processors of a system and includes obtaining a dataset including datapoints, feature values characterizing the datapoints according to input features, and labels classifying the datapoints according to a target label, transforming each respective datapoint into a natural language statement (NLS), each NLS associating the respective datapoint's feature values with feature identifiers assigned to the corresponding input features, and each NLS associating the respective datapoint's label with a label identifier assigned to the target label, generating a feature matrix for each NLS based on the feature identifiers and feature values, transforming the feature matrix into a global feature vector, generating a target vector for each NLS based on the label identifier and the corresponding label, transforming the target vector into a global target vector having a same shape as the global feature vector, and generating, using the global feature vector and the global target vector in conjunction with a similarity measurement operation and a loss function, a classifier model trained to generate a compatibility score predictive of an accuracy at which the classifier model can classify given data based on at least one of a different feature characterizing the given data or a different label for classifying the given data.

Another innovative aspect of the subject matter described in this disclosure can be implemented in a system for generating a contextually adaptable classifier model. An example system includes one or more processors and a memory storing instructions for execution by the one or more processors. Execution of the instructions causes the system to perform operations including obtaining a dataset including datapoints, feature values characterizing the datapoints according to input features, and labels classifying the datapoints according to a target label, transforming each respective datapoint into a natural language statement (NLS), each NLS associating the respective datapoint's feature values with feature identifiers assigned to the corresponding input features, and each NLS associating the respective datapoint's label with a label identifier assigned to the target label, generating a feature matrix for each NLS based on the feature identifiers and feature values, transforming the feature matrix into a global feature vector, generating a target vector for each NLS based on the label identifier and the corresponding label, transforming the target vector into a global target vector having a same shape as the global feature vector, and generating, using the global feature vector and the global target vector in conjunction with a similarity measurement operation and a loss function, a classifier model trained to generate a compatibility score predictive of an accuracy at which the classifier model can classify given data based on at least one of a different feature characterizing the given data or a different label for classifying the given data.

Another innovative aspect of the subject matter described in this disclosure can be implemented as a non-transitory computer-readable medium storing instructions that, when executed by one or more processors of a system for generating a contextually adaptable classifier model, cause the system to perform operations. Example operations include obtaining a dataset including datapoints, feature values characterizing the datapoints according to input features, and labels classifying the datapoints according to a target label, transforming each respective datapoint into a natural language statement (NLS), each NLS associating the respective datapoint's feature values with feature identifiers assigned to the corresponding input features, and each NLS associating the respective datapoint's label with a label identifier assigned to the target label, generating a feature matrix for each NLS based on the feature identifiers and feature values, transforming the feature matrix into a global feature vector, generating a target vector for each NLS based on the label identifier and the corresponding label, transforming the target vector into a global target vector having a same shape as the global feature vector, and generating, using the global feature vector and the global target vector in conjunction with a similarity measurement operation and a loss function, a classifier model trained to generate a compatibility score predictive of an accuracy at which the classifier model can classify given data based on at least one of a different feature characterizing the given data or a different label for classifying the given data.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
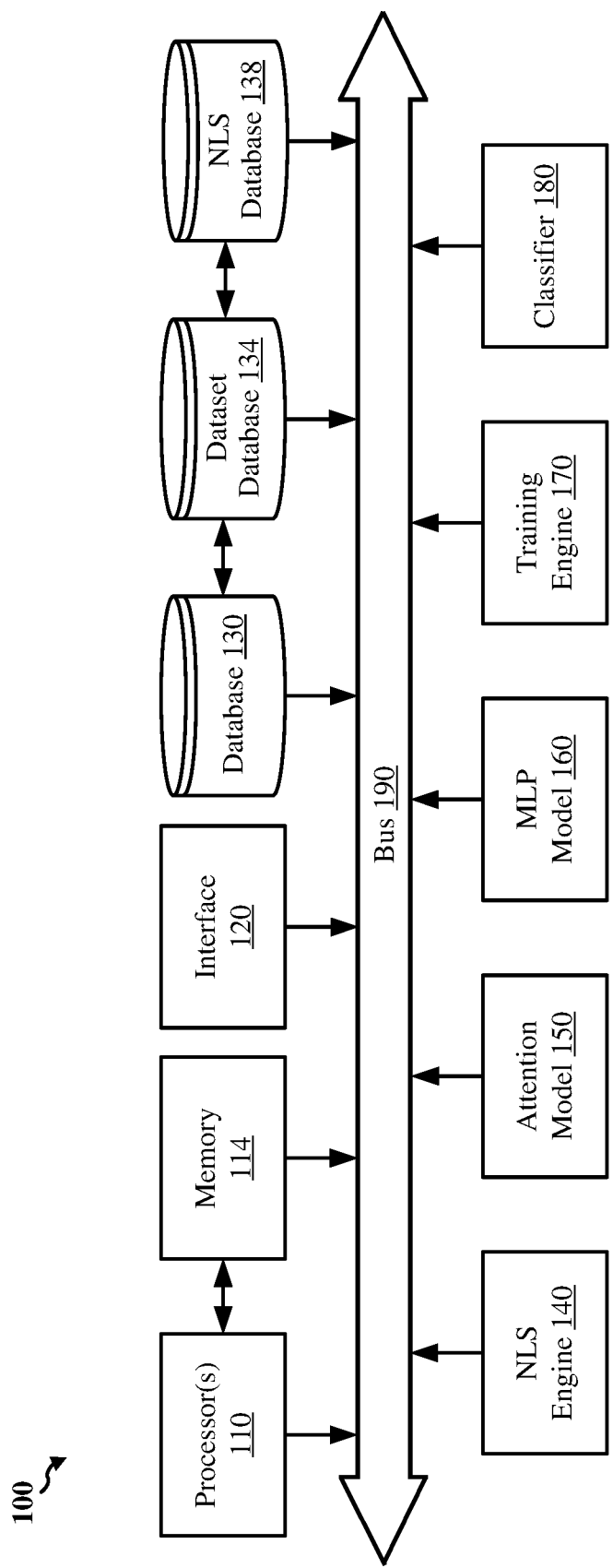
FIG. 1 shows a system, according to some implementations.

As described above, in practice, different classifiers are trained for different tasks. For instance, a different dataset may be used to train a different classifier to perform a different task, such as classifying books by "theme" based on the book's "title", "publisher", "category", and "number of pages". Although some methods of deep learning and/or transfer learning may be used to transfer certain knowledge from one classifier to another, conventional classifier models cannot be easily generalized to different tasks. Thus, there is a need for an ML-based classifier model that can be generalized to different tasks.

Aspects of the present disclosure provide systems and methods for generating and/or deploying a contextually adaptable classifier model that can classify new data based on one or more features or labels different than the features and/or labels on which the classifier model was trained. Specifically, systems and methods are provided for training a classifier using a dataset including datapoints, feature values characterizing the datapoints according to input features, and labels classifying the datapoints according to a target label, such that, once trained, the classifier model can generate a compatibility score predictive of an accuracy at which the model can classify given data based on at least one of a different feature characterizing the given data or a different label for classifying the given data.

As a non-limiting example implementation, aspects of the present disclosure may be used to train a classifier using a dataset that classifies books by "audience" given their "title", "author", "genre", and "word count", such that the trained model can accurately classify books by "theme" given their "title", "publisher", "category", and "number of pages", without being given the book's "author", "genre", or "word count", and even though the model was not trained using a "theme" label nor "publisher", "category", or "number of pages" input features. In this manner, time and resources may be saved in training different classifiers for different classification tasks. Thus, aspects of the present disclosure may be used to generate and/or deploy an adaptable classifier model that is generally input-and-output agnostic such that it can at least determine an accuracy at which it can classify any new data according to any new task, where the accuracy increases with a contextual similarity between the data on which the classifier model was trained and the new data or task.

Various implementations of the subject matter described in this disclosure provide one or more benefits such as transforming datapoints into natural language statements (NLSs), transforming feature identifiers into feature vectors, transforming feature values into feature scalars, concatenating the feature vectors with the feature scalars, generating a feature matrix, transforming the feature matrix into a global feature vector, generating a target vector for each NLS, transforming the target vector into a global target vector, and generating a classifier model trained to generate a compatibility score predictive of an accuracy at which the classifier model can classify given data. Implementations of the subject matter described in this disclosure also provide one or more benefits such as improving user experience (UX), enhancing workflow, reducing errors, minimizing delay, reducing system processing and memory resources, reducing user time and effort, increasing user satisfaction and retention, reducing confusion and frustration, among other benefits.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for generating and/or deploying classifier models. Implementations of the subject matter disclosed herein provide specific inventive steps describing how desired results are achieved and realize meaningful and significant improvements on existing computer functionality—that is, the performance of computer-based systems operating in the evolving technological field of ML-based classification.

FIG. 1 shows a system 100, according to some implementations. Various aspects of the system 100 disclosed herein are generally applicable for generating and/or deploying a contextually adaptable classifier model. The system 100 includes a combination of one or more processors 110, a memory 114 coupled to the one or more processors 110, an interface 120, one or more databases 130, a dataset database 134, a natural language statement (NLS) database 138, an NLS engine 140, an attention model 150, a multilayer perceptron (MLP) model 160, a training engine 170, and/or a classifier 180. In some implementations, the various components of the system 100 are interconnected by at least a data bus 190. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of training data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for receiving input data and/or instructions from a user, outputting data to a user, obtaining one or more datasets from a user, presenting a dataset for review or edits from a user, providing a compatibility score to a user, or the like. In some implementations, the interface 120 is used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, feature values, labels, annotations, training data, validation data, test data, algorithms, loss functions, weights, models, engines, user information, values, ratios, historical data, recent data, current or real-time data, data associated with similarity measurement operations, loss functions, sigmoid functions, and/or dot product operations, compatibility scores, contextual similarity information, one or more ML-based models (e.g., a classifier, a rule-based text extraction model, a natural language generation (NLG) model, a Bidirectional Encoder Representations from Transformers (BERT) model, an attention-based model, a multilayer perceptron (MLP) model, or other suitable models), among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the dataset database 134, the NLS database 138, and/or another suitable physical or cloud-based data store. In some implementations, the database 130 includes a relational database capable of presenting information as data sets in tabular form and capable of manipulating the data sets using relational operators.

The dataset database 134 stores data associated with datasets, such as the datasets themselves, their corresponding datapoints, feature values, input features, labels, and/or target labels, feature identifiers, label identifiers, new and/or different data, labels, or features, weights, ratios, interaction values, or any other suitable data representative of datasets. In some instances, a plurality of datasets are stored in a dataset repository within the dataset database 134. In various implementations, the dataset database 134 is a part of or separate from the database 130 and/or the NLS database 138. In some instances, the dataset database 134 includes data stored in one or more cloud object storage services, such as one or more Amazon Web Services (AWS)-based Simple Storage Service (S3) buckets. In some implementations, all or a portion of the data is stored in a memory separate from the dataset database 134, such as in the database 130, the NLS database 138, and/or another suitable data store.

A dataset may be any set of information, such as tabular data (e.g., a table, a spreadsheet, or the like) arranged in columns and rows and including one or more headers, such as column headers in the first row of the table, where each other row may represent a different datapoint in the dataset. In some implementations, the dataset is in a different format, such as a list. The datasets may be labeled training data to facilitate supervised deep learning. A simple, non-limiting example dataset may include six columns and four rows, where the first row includes column headers for the table (e.g., "Row ID", "Age", "Location", "Gender", "Loan amount", and "Returned the loan?"), the second, third, and fourth rows represent a first, second, and third datapoint in the dataset, and each value in the "Row ID" column is a unique identifier for the datapoint corresponding to the associated row. For this non-limiting example, "Age", "Location", "Gender", and "Loan amount" represent input features for the dataset, and values in the "Age", "Location", "Gender", and "Loan amount" columns are feature values characterizing the datapoints according to the input features. Further for this non-limiting example, "Returned the loan?" is a target label for the dataset, and values in the "Returned the loan?" column are labels classifying the datapoints according to the target label. Example values in the second, third, and fourth rows may include "1, 24, USA, M, 1000, Y", "2, 60, Brazil, F, 1200, Y", and "3, 31, Israel, M, 1800, N", respectively, where "1", "2", and "3" are the unique identifiers for the first, second, and third datapoints, respectively, and where "Y", "Y", and "N" are the labels assigned to the first, second, and third datapoints, respectively. Thus, for this example: a first datapoint has feature values of 24, USA, M, and 1000; a second datapoint has feature values of 60, Brazil, F, and 1200; and a third datapoint has feature values of 31, Israel, M, and 1800. In practice, a dataset may include hundreds or thousands of datapoints. It is to be understood that features, feature values, labels, and/or label values may be of various types, such as numeric, categorical, textual, or the like, depending on the nature of the dataset.

The NLS database 138 stores data associated with natural language statements (NLSs), such as the NLSs themselves, feature matrices, feature vectors, global feature vectors, feature scalars, concatenations, target vectors, global target vectors, vector shapes and/or dimensions, contextual similarity information, or any other suitable data representative of NLSs. In some instances, NLSs are stored in a table including a row for each NLS and a column for one or more suitable NLS attributes. In various implementations, the NLS database 138 is a part of or separate from the database 130 and/or the dataset database 134. In some instances, the NLS database 138 includes data stored in one or more cloud object storage services, such as one or more Amazon Web Services (AWS)-based Simple Storage Service (S3) buckets. In some implementations, all or a portion of the data is stored in a memory separate from the NLS database 138, such as in the database 130, the dataset database 134, and/or another suitable data store.

The NLS engine 140 may be used to generate the NLSs. Specifically, the NLS engine 140 may be used to obtain a dataset from the dataset database 134, where the dataset includes datapoints, feature values characterizing the datapoints according to input features, and labels classifying the datapoints according to a target label. Thereafter, the NLS engine 140 may be used to transform each datapoint into an NLS. Each NLS may associate the respective datapoint's feature values with feature identifiers assigned to the corresponding input features. For the example dataset described above, the NLS engine 140 may be configured to interpret "Age", "Location", "Gender", and "Loan amount" as the feature identifiers; thus, the NLS engine 140 associates each datapoint's feature values with the feature identifiers, "Age", "Location", "Gender", and "Loan amount". For this instance, the NLS engine 140 extracts the feature values characterizing the first datapoint (e.g., 24, USA, M, and 1000) and associates them with the feature identifiers, such as with colons and commas, e.g., $X^1$={age: 24, location: "USA", gender: "M", loan amount: 1000}.

The NLS engine 140 may also be configured to associate each datapoint's label with a label identifier assigned to the target label. For the example dataset described above, the NLS engine 140 may be configured to interpret "Returned the loan?" as the label identifier; thus, the NLS engine 140 associates each datapoint's label with the label identifier, "Returned the loan?". For this instance, the NLS engine 140 extracts the label classifying the first datapoint (e.g., Y) and associates it with the label identifier, e.g., $Y^1$ (returned_loan)=Y. In some instances, the NLS engine 140 may determine that "Y" is a binary classification and thus replace "Y" with 1 or True, e.g., $Y^1$ (returned_loan)=True. Thus, for this example, the NLS engine 140 may transform the first datapoint into a first NLS including $X^1$ and $Y^1$ as follows: {"Age": 24, "Location": "USA", "Gender": "Male", "Loan amount": 1200, "Returned the loan": True}, and may store the NLS in a JSON file, for example. In some implementations, the labels may be continuous values, such as for regression tasks.

In some implementations, the NLS engine 140 extracts the information from the dataset using at least one of a rule-based text extraction model or an NLG model. In some implementations, the NLS engine 140 stores such information in at least one of a JSON file or a CSV file. In these and other manners, the NLS engine 140 may be used to transform datapoints into NLSs based in part on extracting each datapoint's feature values, the identifiers for the input features, each datapoint's label, and the identifier for the target label from the dataset. Based in part on incorporating the feature identifiers and label identifier metafeatures as natural language, the system 100 may learn to generate predictions about new data based on a contextual similarity with the feature identifiers and label identifiers associated with the new data, as described below.

The NLS engine 140 may also be used to transform the feature identifiers associated with the NLSs into corresponding feature vectors. In some implementations, the NLS engine 140 uses a word and/or sentence embedding technique to transform the feature identifiers into the feature vectors such that they capture meaning, semantics, and/or contextual information about the words and/or sentences in a compact numerical representation. Thus, for the example dataset described above, the NLS engine 140 may use a pretrained NLP model (BERT, for example) to transform each of the feature identifiers (e.g., {"Age", "Location", "Gender", and "Loan amount"}) into a corresponding feature vector such that a deep learning-based neural network model may incorporate the feature identifiers as natural language such that learn patterns and relationships from the data so as to intelligently comprehend a context of the natural language. In some instances, the pretrained NLP model incorporates one or more aspects of a generative pretrained transformer (GPT) model, a Universal Sentence Encoder (USE), and/or InferSent. In some other instances, the word and/or sentence embeddings are generated based in part on Word2Vec, Global Vectors for Words Representations (GloVe), and/or FastText. By embedding a latent representation of each feature identifier in a shared vector space, contextually more similar feature identifiers will be located closer together in the vector space, and vice versa. In this manner, upon obtaining an additional dataset including a "Country" feature identifier (for example), the NLS engine 140 may embed a latent representation of "Country" in the vector space such that it is relatively close to the latent representation of "Location" in the vector space. In contrast, a latent representation of the "Gender" feature identifier or an "Antipode" feature identifier (for examples) may be embedded relatively far from the latent representations of "Location" and "Country".

The NLS engine 140 may also be used to transform one or more of the feature values associated with the NLSs, such as categorical feature values, into corresponding feature scalars. Thus, for the example dataset described above, the NLS engine 140 may use a pretrained DL model (for example) to transform each unique, non-scalar feature value (e.g., {"USA", "M", "Brazil", "F", "Israel"}) into a corresponding feature scalar, such that contextually more similar feature scalars are represented more similarly, and vice versa. For instance, the NLS engine 140 may be used in conjunction with the DL model to transform a "Male" feature value (e.g., from a subsequently obtained dataset) into a feature scalar more similar to the feature scalar generated for "M" than to the feature scalar generated for "F". In this manner, the NLS engine 140 learns relative embedded representations for the feature values in the datasets.

The NLS engine 140 may also be used to concatenate the feature vectors with the feature scalars. In some implementations, the NLS engine 140 generates single, concatenated vectors in conjunction with a pretrained vector embedding model. Specifically, upon transforming the feature identifiers and the feature values associated with the NLSs into corresponding feature vectors and feature scalars, respectively, the NLS engine 140 may be used to generate a single vector for each NLS. In some implementations, each single vector includes k elements, where the first k-1 elements of the single vector includes each of the feature vectors associated with the NLS, and where the final k element of the single vector includes each of the feature scalars associated with the NLS. Thus, for the example dataset described above, the first k-1 elements of the single vector generated for the first NLS (corresponding to the first datapoint) will include the feature vectors corresponding to the "Age", "Location", "Gender", and "Loan amount" feature identifiers, and the final k element of the single vector generated for the first NLS will include the feature scalars corresponding to the "24", "USA", "M", and "1000" feature values. Similarly, the first k-1 elements of the single vector generated for the second NLS (corresponding to the second datapoint) will include the feature vectors corresponding to the "Age", "Location", "Gender", and "Loan amount" feature identifiers, and the final k element of the single vector generated for the second NLS will include the feature scalars corresponding to the "60", "Brazil", "F", and "1200" feature values, and so on.

The NLS engine 140 may also be used to generate a feature matrix. Specifically, the feature matrix is generated as a combination of each of the single vectors generated for the NLSs described above, where the embedding size (or shape or dimensionality) of the feature matrix is based on the total number of input features (e.g., 4 for the example dataset described above) over the total number of datapoints (e.g., 3 for the example dataset described above) plus one, where the plus one represents the concatenated feature scalars discussed above. In this manner, the NLS engine 140 may be used to generate a single feature matrix for the dataset based in part on transforming the feature identifiers associated with the dataset into feature vectors, transforming the feature values associated with the dataset into feature scalars, and concatenating the feature vectors with the feature scalars.

The NLS engine 140 may also be used to transform the feature matrix into a global feature vector. Specifically, the NLS engine 140 may be used in conjunction with an attention-based model (e.g., the attention model 150) to transform the feature matrix into the global feature vector. The global feature vector may also be referred to herein as $\alpha$. As an attention-based model can accept any arbitrarily sized matrix as input and dynamically assign different weights or importance to different elements of the input, the NLS engine 140 may train the attention model 150 to transform any sized feature matrix into the global feature vector, regardless of the number of input features in in the corresponding dataset. In this manner, the NLS engine 140 is used in conjunction with the attention model 150 to generate a single vector, $\alpha$, that encapsulates a meaning of and a contextual similarity between each of the input features and each of the feature values included in the dataset. In some implementations, upon obtaining one or more additional datasets (of any size(s)), the NLS engine 140 may be configured to transform the additional datapoints into additional NLSs, generate an augmented feature matrix using the additional NLSs, and generate an augmented global feature vector, $\alpha'$, where $\alpha'$ encapsulates a meaning of and a contextual similarity between the input features and feature values included in the original dataset as well as the one or more additional datasets.

The NLS engine 140 may also be used to generate a target vector for each NLS. Specifically, the NLS engine 140 uses a sentence embedding technique to transform the label identifier(s) into a target vector. Thus, for the example dataset described above, the NLS engine 140 may use a pretrained NLP model (BERT, for example) to transform the label identifier(s) (e.g., "Returned the loan?") into a target vector that incorporates the label identifier(s) as natural language. In this manner, upon obtaining an additional dataset including a "Has good credit?" label identifier (for example), the NLS engine 140 may embed a latent representation of "Has good credit?" in the vector space such that it is relatively close to the latent representation of "Returned the loan?" in the vector space. In contrast, latent representations of a "Will file for bankruptcy?" label identifier or a "Plays checkers?" label identifier (for examples) may be embedded relatively far from the latent representations of "Returned the loan?" and "Has good credit?". The labels (e.g., "Y/N", "1/0", "True/False", or any other categorical label values) may also be transformed and concatenated with the target vector (e.g., in a single vector) in a similar manner as described above with respect to the feature values and feature vectors.

The NLS engine 140 may also be used to transform the target vector into a global target vector. Specifically, the NLS engine 140 may be used in conjunction with an MLP-based model (e.g., the MLP model 160) to transform the target vector into a global target vector. In some instances, another suitable type of feedforward artificial neural network is used. The global target vector may also be referred to herein as $\lambda$. As an MLP-based model can accept a vector as input and return a vector of any arbitrarily selected size, the NLS engine 140 may train the MLP model 160 to transform the target vector into a global target vector having a same size and/or shape as the global feature vector. In this manner, the NLS engine 140 is used in conjunction with the MLP model 160 to generate a single vector, $\lambda$, which represents the hidden latent representation of each of the target labels and each of the label values in the dataset. In some implementations, upon obtaining one or more additional datasets (of any arbitrary size(s)), the NLS engine 140 may be configured to transform the additional datapoints into additional NLSs, generate an augmented target vector using the additional NLSs, and generate an augmented global target vector, $\lambda'$, where $\lambda'$ represents the hidden latent representation of each of the target labels and label values in in the original dataset as well as in the one or more additional datasets.

The training engine 170 may be used to generate a classifier model, such as by training the classifier 180. As further described below, the training engine 170 may train the classifier 180 using the global feature vector and the global target vector in conjunction with a similarity measurement operation and a loss function such that the model's weights and parameters are iteratively adjusted until an accuracy of the model's predictions on new data reaches a desired value. In some implementations, the classifier 180 is trained using one or more aspects of contrastive learning. By transforming the target vector into a global target vector having a same size and/or shape as the global feature vector (as discussed above), the similarity measurement operation may be a dot product operation in some implementations—that is, the system 100 generates a dot product from the global feature vector and the global target vector. In some instances, a scalar result of the dot product operation is input into a sigmoid (or another suitable "squishing") function such that it fits within a desired, bounded range (e.g., 0-1), and the compatibility score is based on the result of the sigmoid function. In this manner, the compatibility score may be interpreted as a ratio or percentage, which may be used to suggest a predicted accuracy of labels generated by the classifier 180 for the data given. In some implementations, one or more other activation functions are applied, such as the Rectified Linear Unit (ReLU), Parametric Rectified Linear Unit (PReLU), tanh, or SoftMax. In some other implementations, one or more other similarity metrics are utilized to determine a similarity between vectors, such as a cosine similarity metric, a Euclidean distance, one or more kernel functions, a Mahalanobis distance, a Manhattan distance, a Jaccard similarity, a Pearson correlation coefficient, a Spearman's rank correlation coefficient, a Kendall's tau correlation coefficient, or the like. The training engine 170 may use one or more loss functions to iteratively adjust the parameters of the classifier 180 until the dot product of the global feature vector and the global target vector results in a compatibility score greater than an acceptable value. In some implementations, the model's weights are adjusted using a backpropagation optimization technique such that a difference between predicted labels and true labels is minimized. In some instances, the weights are iteratively tuned using a gradient descent technique. The loss function may be a log logarithmic loss function, and the classifier 180 may be trained to minimize the logarithmic log loss function until the compatibility score is greater than the acceptable value.

Once trained, the classifier 180 (or "the trained classifier" or "the classifier model") may be used to generate a compatibility score predictive of an accuracy at which the classifier model can classify given data, such as one or more additional datasets. For instance, if the one or more additional datasets include datapoints characterized by one or more features different than the input features on which the classifier 180 was trained, the compatibility score may suggest an accuracy at which the classifier model can classify the given data based on the one or more different features. Similarly, if the one or more additional datasets include datapoints (to be) classified by one or more target labels different than the target labels on which the classifier 180 was trained, the compatibility score may suggest an accuracy at which the classifier model can classify the given data based on the one or more different target labels. By training the classifier model to automatically adapt to new data (or a new task) based on a context of the new data in the manners described above, the compatibility score may generally increase as a contextual similarity between the original input feature(s) and the different feature(s) increases (and vice versa) and/or as a contextual similarity between the original target label(s) and the different label(s) increases (and vice versa).

As a non-limiting example, the classifier 180 may be trained using an original dataset associated with original input features (e.g., "Age", "Location", "Gender", and "Loan amount") and an original target label (e.g., "Returned the loan?") in the manners described above. Thereafter, a new dataset including new datapoints may be input to the trained classifier model. It will be understood that the compatibility score generated for the new dataset will be less than 100% if the new dataset is not identical to the original dataset. For one example, the new dataset may include a "City" input feature, corresponding feature values (e.g., "Tianjin", "Kolkata", "Houston", and "Fortaleza") for each of the new datapoints, and a target label (e.g., "Predicted to have good credit?"). By transforming each of the new datapoints into NLSs and generating an augmented global feature vector ($\alpha'$) and global target vector ($\lambda'$) that incorporate the new data, the trained classifier model may intelligently determine that the "City" input feature has a relatively high contextual similarity to the "Location" input feature on which the model was trained, that the "Predicted to have good credit?" target label has a relatively high contextual similarity to the "Returned the loan?" target label on which the model was trained (e.g., based on a result of the dot product of the corresponding global feature vector and global target vector), and thus may generate a relatively high compatibility score for the new dataset. The compatibility score may also be increased for the new dataset if the original dataset included original feature values (e.g., "USA", "Brazil") with at least some extent of contextually similar to the feature values in the new dataset (e.g., "Houston", "Fortaleza," respectively).

In some other implementations, the trained classifier model may be presented with a new target label and generate predicted labels for the original datapoints on which the model was trained. Furthermore, if a new target label results in a relatively opposite dot product as the original target label, the trained model can intelligently determine that the datapoints should receive relatively opposite labels for the new target label. For instance, if the sigmoid function at the dot product phase for the original target label ("Returned the loan?") is 7 (i.e., approximately 1 on a scale of 0-1), and the new sigmoid function at the dot product phase for a new target label (e.g., "Loan default?") is −7 (i.e., approximately 0 on the scale of 0-1), the trained model can intelligently determine that the original and new target labels have relatively high contextual similarity (i.e., the compatibility score will be relatively high), and furthermore can intelligently determine that the resultant labels for datapoints having relatively similar feature values will have relatively opposite values. In these and other manners, the classifier 180 is trained to be contextually adaptable to new data such that it can generate meaningful predictions based on input features, feature values, target labels, and/or labels not previously seen by the classifier model. Although it will be understood that new data having at least some contextual and/or domain similarity to the input features, feature values, target labels, and/or labels on which the model was initially trained will result in higher compatibility, the trained classifier model may be used to determine a predicted accuracy of labels to be generated for any data previously unseen by the model, regardless of domain.

The NLS engine 140, the attention model 150, the MLP model 160, the training engine 170, and/or the classifier 180 are implemented in software, hardware, or a combination thereof. In some implementations, any one or more of the NLS engine 140, the attention model 150, the MLP model 160, the training engine 170, or the classifier 180 is embodied in instructions that, when executed by the processor 110, cause the system 100 to perform operations. In various implementations, the instructions of one or more of said components, the interface 120, the dataset database 134 and/or the NLS database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples of generating a contextually adaptable classifier model are described with reference to the system 100, other suitable system configurations may be used.

Figure 2:
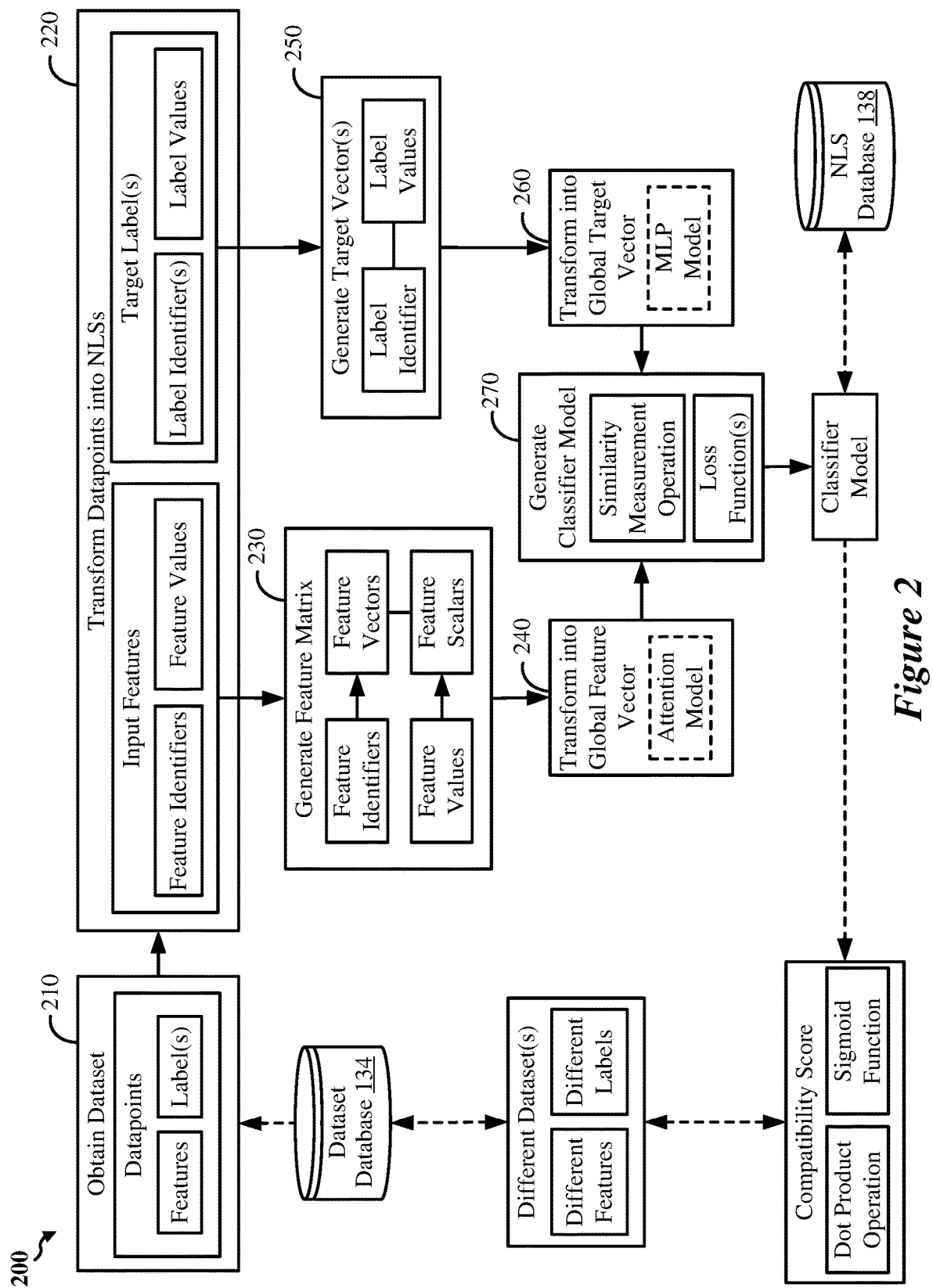
FIG. 2 shows a high-level overview of an example process flow employed by a system, according to some implementations.

FIG. 2 shows a high-level overview of an example process flow 200 employed by a system, according to some implementations, during which a classifier model is generated and trained to predict an accuracy at which it can classify given data based on different features and/or different labels. In various implementations, the system incorporates one or more (or all) aspects of the system 100. In some implementations, various aspects described with respect to FIG. 1 are not incorporated, such as the dataset database 134, the NLS database 138, the NLS engine 140, and/or the training engine 170.

At block 210, the system 100 obtains a dataset including datapoints, feature values characterizing the datapoints according to input features, and labels classifying the datapoints according to one or more target labels. The dataset may be obtained from the dataset database 134 and/or the database 130.

At block 220, the system 100 transforms each respective datapoint into a natural language statement (NLS), each NLS associating the respective datapoint's feature values with feature identifiers assigned to the corresponding input features, and each NLS associating the respective datapoint's label with a label identifier assigned to the target label. Respective datapoints may be transformed into NLSs based in part on extracting, from the dataset, the respective datapoint's feature values, the respective datapoint's label value(s), the identifiers for the input features, and the identifier(s) for the target label(s). In some implementations, the datapoints are transformed into NLSs using at least one of a JavaScript Object Notation (JSON) file, a comma-separated values (CSV) file, a rule-based text extraction model, or a natural language generation (NLG) model.

At block 230, the system 100 generates a feature matrix for each NLS based on the feature identifiers and feature values. In some implementations, generating the feature matrix includes transforming the feature identifiers associated with the given NLS into corresponding feature vectors. In some instances, the feature identifiers are transformed into vectors using a Bidirectional Encoder Representations from Transformers (BERT) model. In some other implementations, generating the feature matrix includes transforming the feature values associated with the given NLS into corresponding feature scalars. In some of such implementations, generating the feature matrix includes concatenating the feature vectors corresponding to the given NLS with the feature scalars corresponding to the given NLS. At block 240, the system 100 transforms the feature matrix into a global feature vector. The feature matrix may be transformed into the global feature vector using an attention-based model.

At block 250, the system 100 generates a target vector for each NLS based on the label identifier and the corresponding label value(s). At block 260, the system 100 transforms the target vector into a global target vector having a same shape as the global feature vector. The target vector may be transformed into the global target vector using a multilayer perceptron (MLP) model.

At block 270, the system 100 generates a classifier model using the global feature vector and the global target vector in conjunction with a similarity measurement operation and one or more loss functions. The classifier model may be trained to generate a compatibility score predictive of an accuracy at which it can classify given data based on at least one of a different feature characterizing the given data or a different label for classifying the given data. In some implementations, the similarity measurement operation is a dot product operation. In some of such implementations, generating the compatibility score includes inputting a result of the dot product operation into a sigmoid function. In some instances, the compatibility score increases with a contextual similarity between the input features and the different features. In some instances, the compatibility score increases with a contextual similarity between the target label and the different label. In some implementations, the loss function is a logarithmic loss function, and the classifier is trained to minimize the logarithmic loss function.

In some implementations, after block 270, the system 100 stores one or more of the NLSs in a database, such as the NLS database 138. In some instances, the system 100 retrieves additional NLSs from the NLS database 138 in generating the compatibility score. In some instances, the different feature(s) and/or different label(s) are obtained from the dataset database 134 and used by the trained classifier model in generating the compatibility score.

Figure 3:
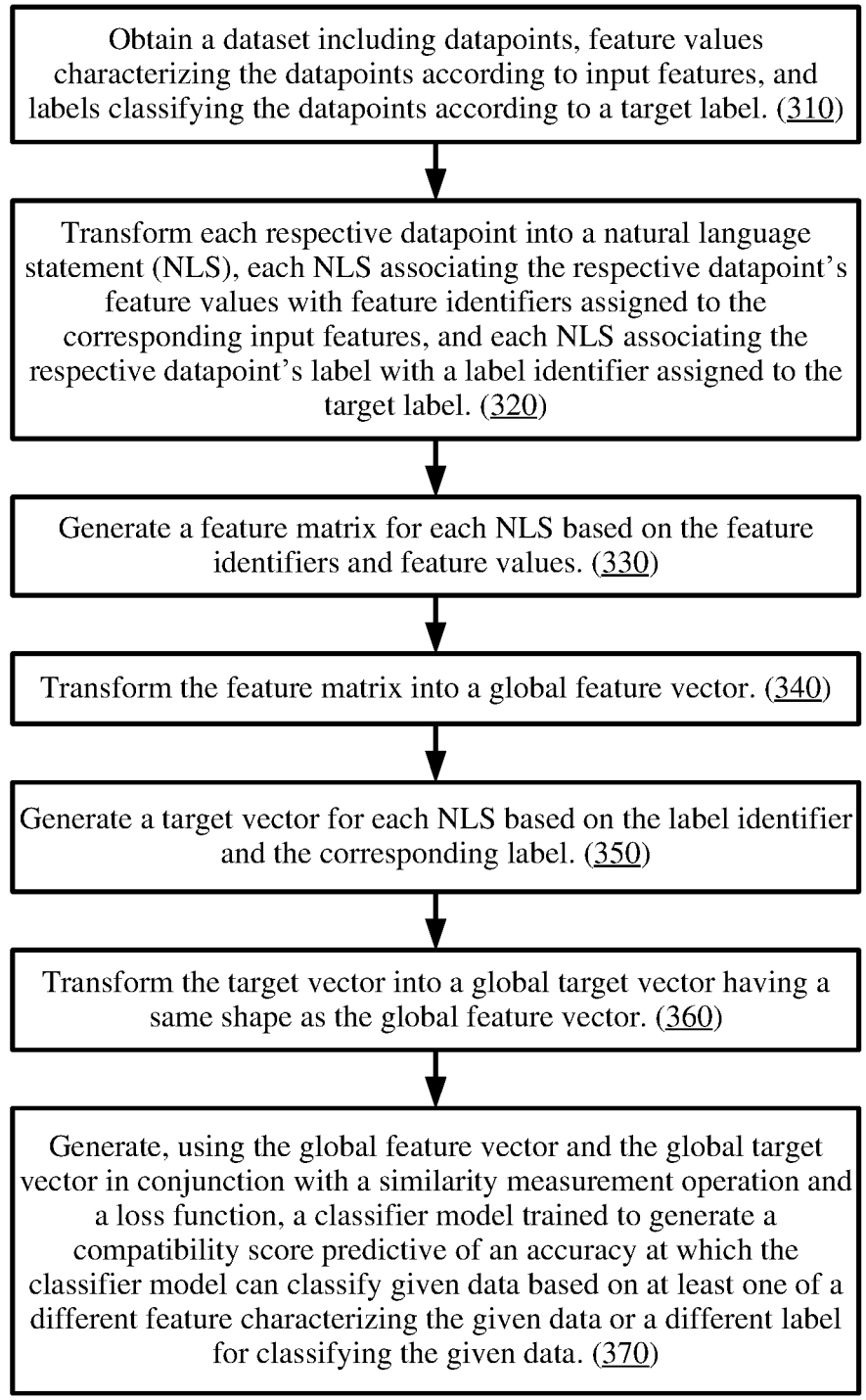
FIG. 3 shows an illustrative flowchart depicting an example operation for generating a contextually adaptable classifier model, according to some implementations.

FIG. 3 shows a high-level overview of an example process flow 300 employed by the system 100 of FIG. 1 and/or the system described with respect to FIG. 2, according to some implementations, during which a classifier model is generated and trained to predict an accuracy at which it can classify given data based on different features and/or different labels. At block 310, the system 100 obtains a dataset including datapoints, feature values characterizing the datapoints according to input features, and labels classifying the datapoints according to a target label. At block 320, the system 100 transforms each respective datapoint into a natural language statement (NLS), each NLS associating the respective datapoint's feature values with feature identifiers assigned to the corresponding input features, and each NLS associating the respective datapoint's label with a label identifier assigned to the target label. At block 330, the system 100 generates a feature matrix for each NLS based on the feature identifiers and feature values. At block 340, the system 100 transforms the feature matrix into a global feature vector. At block 350, the system 100 generates a target vector for each NLS based on the label identifier and the corresponding label. At block 360, the system 100 transforms the target vector into a global target vector having a same shape as the global feature vector. At block 370, the system 100 generates, using the global feature vector and the global target vector in conjunction with a similarity measurement operation and a loss function, a classifier model trained to generate a compatibility score predictive of an accuracy at which the classifier model can classify given data based on at least one of a different feature characterizing the given data or a different label for classifying the given data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for generating a contextually adaptable machine learning (ML) based classifier model, the method comprising:
    obtaining a dataset including datapoints, feature values characterizing the datapoints according to input features, and labels classifying the datapoints according to a target label;
    transforming each respective datapoint into a natural language statement (NLS), each NLS associating the respective datapoint's feature values with feature identifiers assigned to the corresponding input features, and each NLS associating the respective datapoint's label with a label identifier assigned to the target label;
    generating a feature matrix for each NLS based on the feature identifiers and feature values;
    transforming the feature matrix into a global feature vector;
    generating a target vector for each NLS based on the label identifier and the corresponding label;
    transforming the target vector into a global target vector having a same shape as the global feature vector; and
    generating, using the global feature vector and the global target vector in conjunction with a similarity measurement operation and a loss function, an ML-based classifier model trained to generate, using one or more neural network models, a compatibility score predictive of an accuracy at which the classifier model can classify given data based on at least one of a different feature characterizing the given data or a different label for classifying the given data.

2. The method of claim 1, wherein the datapoints are transformed into NLSs based in part on extracting the respective datapoint's feature values, the identifiers for the input features, the respective datapoint's label, and the identifier for the target label from the dataset using at least one of a JavaScript Object Notation (JSON) file, a comma-separated values (CSV) file, a rule-based text extraction model, or a natural language generation (NLG) model.

3. The method of claim 1, wherein generating the feature matrix for a given NLS includes:
    transforming the feature identifiers associated with the given NLS into corresponding feature vectors; and
    transforming the feature values associated with the given NLS into corresponding feature scalars.

4. The method of claim 3, wherein generating the feature matrix for a given NLS includes:
    concatenating the feature vectors corresponding to the given NLS with the feature scalars corresponding to the given NLS.

5. The method of claim 3, wherein the feature identifiers are transformed into vectors using a Bidirectional Encoder Representations from Transformers (BERT) model.

6. The method of claim 1, wherein the feature matrix is transformed into the global feature vector using an attention-based model.

7. The method of claim 1, wherein the target vector is transformed into the global target vector using a multilayer perceptron (MLP) model.

8. The method of claim 1, wherein the similarity measurement operation is a dot product operation, and wherein generating the compatibility score includes inputting a result of the dot product operation into a sigmoid function.

9. The method of claim 1, wherein the compatibility score increases with at least one of a contextual similarity between the input features and the different feature or a contextual similarity between the target label and the different label.

10. The method of claim 1, wherein the loss function is a logarithmic loss function, and wherein the classifier is trained to minimize the logarithmic loss function.

11. A system for generating a contextually adaptable machine learning (ML) based classifier model, the system comprising:
one or more processors; and
a memory communicatively coupled with the one or more processors and storing instructions that, when executed by the one or more processors, causes the system to perform operations including:
obtaining a dataset including datapoints, feature values characterizing the datapoints according to input features, and labels classifying the datapoints according to a target label;
transforming each respective datapoint into a natural language statement (NLS), each NLS associating the respective datapoint's feature values with feature identifiers assigned to the corresponding input features, and each NLS associating the respective datapoint's label with a label identifier assigned to the target label;
generating a feature matrix for each NLS based on the feature identifiers and feature values;
transforming the feature matrix into a global feature vector;
generating a target vector for each NLS based on the label identifier and the corresponding label;
transforming the target vector into a global target vector having a same shape as the global feature vector; and
generating, using the global feature vector and the global target vector in conjunction with a similarity measurement operation and a loss function, an ML-based classifier model trained to generate, using one or more neural network models, a compatibility score predictive of an accuracy at which the classifier model can classify given data based on at least one of a different feature characterizing the given data or a different label for classifying the given data.

12. The system of claim 11, wherein the datapoints are transformed into NLSs based in part on extracting the respective datapoint's feature values, the identifiers for the input features, the respective datapoint's label, and the identifier for the target label from the dataset using at least one of a JavaScript Object Notation (JSON) file, a comma-separated values (CSV) file, a rule-based text extraction model, or a natural language generation (NLG) model.

13. The system of claim 11, wherein generating the feature matrix for a given NLS includes:
transforming the feature identifiers associated with the given NLS into corresponding feature vectors; and
transforming the feature values associated with the given NLS into corresponding feature scalars.

14. The system of claim 13, wherein generating the feature matrix for a given NLS includes:
concatenating the feature vectors corresponding to the given NLS with the feature scalars corresponding to the given NLS.

15. The system of claim 13, wherein the feature identifiers are transformed into vectors using a Bidirectional Encoder Representations from Transformers (BERT) model.

16. The system of claim 11, wherein the feature matrix is transformed into the global feature vector using an attention-based model.

17. The system of claim 11, wherein the target vector is transformed into the global target vector using a multilayer perceptron (MLP) model.

18. The system of claim 11, wherein the similarity measurement operation is a dot product operation, and wherein generating the compatibility score includes inputting a result of the dot product operation into a sigmoid function.

19. The system of claim 11, wherein the compatibility score increases with at least one of a contextual similarity between the input features and the different feature or a contextual similarity between the target label and the different label.

20. The system of claim 11, wherein the loss function is a logarithmic loss function, and wherein the classifier is trained to minimize the logarithmic loss function.

* * * * *